(12) United States Patent
Takaki

(10) Patent No.: US 10,569,767 B2
(45) Date of Patent: Feb. 25, 2020

(54) VEHICLE CONTROL APPARATUS AND VEHICLE CONTROL METHOD

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 248 days.

(21) Appl. No.: 15/839,657

(22) Filed: Dec. 12, 2017

(65) Prior Publication Data
US 2018/0162392 A1 Jun. 14, 2018

(30) Foreign Application Priority Data

Dec. 14, 2016 (JP) ................. 2016-242667

(51) Int. Cl.
| | | |
|---|---|---|
| *B60W 30/09* | (2012.01) | |
| *G08G 1/16* | (2006.01) | |
| *G01S 13/93* | (2006.01) | |
| *B60W 10/18* | (2012.01) | |
| *G06K 9/00* | (2006.01) | |
| *B60W 50/14* | (2012.01) | |
| *G01S 13/931* | (2020.01) | |

(52) U.S. Cl.
CPC ............ *B60W 30/09* (2013.01); *B60W 10/18* (2013.01); *B60W 50/14* (2013.01); *G01S 13/931* (2013.01); *G06K 9/00805* (2013.01); *G08G 1/166* (2013.01); *B60W 2050/143* (2013.01); *B60W 2420/42* (2013.01); *B60W 2420/52* (2013.01)

(58) Field of Classification Search
CPC ...... B60W 30/09; B60W 10/18; B60W 50/14; G01S 13/931
See application file for complete search history.

(56) References Cited

U.S. PATENT DOCUMENTS

2018/0297591 A1* 10/2018 Minemura ............ B60W 30/09

FOREIGN PATENT DOCUMENTS

| JP | 2011-197915 | 10/2011 |
|---|---|---|
| JP | 2014-034289 | 2/2014 |
| JP | 2016-120914 | 7/2016 |

* cited by examiner

*Primary Examiner* — Michael D Lang
(74) *Attorney, Agent, or Firm* — Knobbe, Martens, Olson & Bear, LLP

(57) ABSTRACT

When a likelihood of a collision between an object and an own vehicle is determined to be present, an vehicle control apparatus calculates an object width indicating a size of the object in a lateral direction and an overlap ratio indicating a proportion of an amount of overlap in the lateral direction between the calculated object width and a determination area that is virtually set ahead of the own vehicle. Based on the calculated overlap ratio, an operation timing for a collision avoidance control is set. The object width is changed when the overlap ratio is less than a predetermined threshold such that the object width is less than the object width when the overlap ratio is greater than the predetermined threshold. The operation timing for the collision avoidance control is set based on a new overlap ratio calculated based on the determination area and the object width after change.

15 Claims, 9 Drawing Sheets

VEHICLE CONTROL APPARATUS AND VEHICLE CONTROL METHOD

CROSS-REFERENCE TO RELATED APPLICATION

This application is based on and claims the benefit of priority from Japanese Patent Application No, 2016-242667, filed Dec. 14, 2016. The entire disclosure of the above application is incorporated herein by reference.

BACKGROUND

Technical Field

The present disclosure relates to a vehicle control apparatus and a vehicle control method.

Related Art

Conventionally, a vehicle control apparatus that calculates an overlap ratio in a lateral direction between an own vehicle and an object ahead of the own vehicle is known. The vehicle control apparatus sets an operation timing for collision avoidance control that is performed to avoid a collision between the object and the own vehicle, based on the overlap ratio. The overlap ratio is an index value that is used to determine a risk of collision between the own vehicle and an object that is positioned ahead of the own vehicle. For example, the vehicle control apparatus calculates an object width based on a captured image that captures an area ahead of the own vehicle. The object width indicates a size of an object in the lateral direction. The vehicle control apparatus then calculates the overlap ratio based on the object width in the lateral direction that overlaps with a determination width that is virtually set ahead of the own vehicle.

JP-A-2016-120914 discloses an apparatus that changes an overlap ratio between an own vehicle and a vehicle parked in the periphery of the own vehicle when the own vehicle is being parked in a predetermined parking position or being started from the predetermined parking position.

When the object width is detected from a captured image, in some cases, the object width may be calculated to be greater than an actual object width as a result of erroneous recognition of the shape of the object. For example, when the vehicle control apparatus calculates the object width to be greater than the actual object width, the overlap ratio increases. The operation timing for the collision avoidance control may change. The change in the operation timing for the collision avoidance control may result in an unnecessary operation of the collision avoidance control.

SUMMARY

It is thus desired to provide a vehicle control apparatus that is capable of performing collision avoidance control regarding an object at an appropriate tuning and a vehicle control method.

An exemplary embodiment provides a vehicle control apparatus that performs collision avoidance control to avoid a collision with an object ahead of an own vehicle. The vehicle control apparatus includes: an object recognizing unit that recognizes at least a position of the object based on a captured image in which an area ahead of the own vehicle is captured by an image sensor; a collision determining unit that determines a likelihood of a collision between the own vehicle and the object of which the position is recognized; a lateral width calculating unit that calculates an object width indicating a size of the object in a lateral direction, based on the captured image, when the likelihood of a collision between the object and the own vehicle is determined to be present; an overlap ratio calculating unit that calculates an overlap ratio indicating a proportion of an amount of overlap in the lateral direction between the calculated object width and a determination area that is virtually set ahead of the own vehicle; and a timing setting unit that sets an operation timing for the collision avoidance control based on the calculated overlap ratio. The timing setting unit changes the object width when the overlap ratio is less than a predetermined threshold such that the object width is less than the object width when the overlap ratio is greater than the predetermined threshold, and sets the operation timing for the collision avoidance control based on a new overlap ratio calculated based on the determination area and the object width after change.

When the overlap ratio is less than the predetermined threshold, the object width that overlaps with the determination area decreases, compared to when the overlap ratio is greater than the predetermined threshold. The proportion occupied by an error in the object width increases. In this regard, in the above-described configuration, when the overlap ratio is less than the predetermined threshold, the object width is changed such that the object width is less than the object width when the overlap ratio is greater than the predetermined threshold.

Then, a new overlap ratio between the determination area and the object width after change is calculated. The operation timing for the collision avoidance control performed to avoid a collision with the object is set based on the new overlap ratio that has been calculated. In this case, distinction is made between an overlap ratio at which the operation timing for the collision avoidance control is easily affected by an error in the object width and an overlap ratio at which the operation timing for the collision avoidance control is not easily affected by the error in the object width. The object width is reduced when the overlap ratio is equal to or less than the threshold.

In addition, at the overlap ratio equal to or greater than the threshold at which the operation timing for the collision avoidance control is not easily affected by error in the object width, the object width is not changed. As a result, the setting of the operation timing based on the overlap ratio is prioritized. Consequently, the effects that an error in the object width has on the operation timing for the collision avoidance control can be suppressed. The collision avoidance control can be performed at an appropriate timing.

DESCRIPTION OF THE EMBODIMENTS

Figure 1:
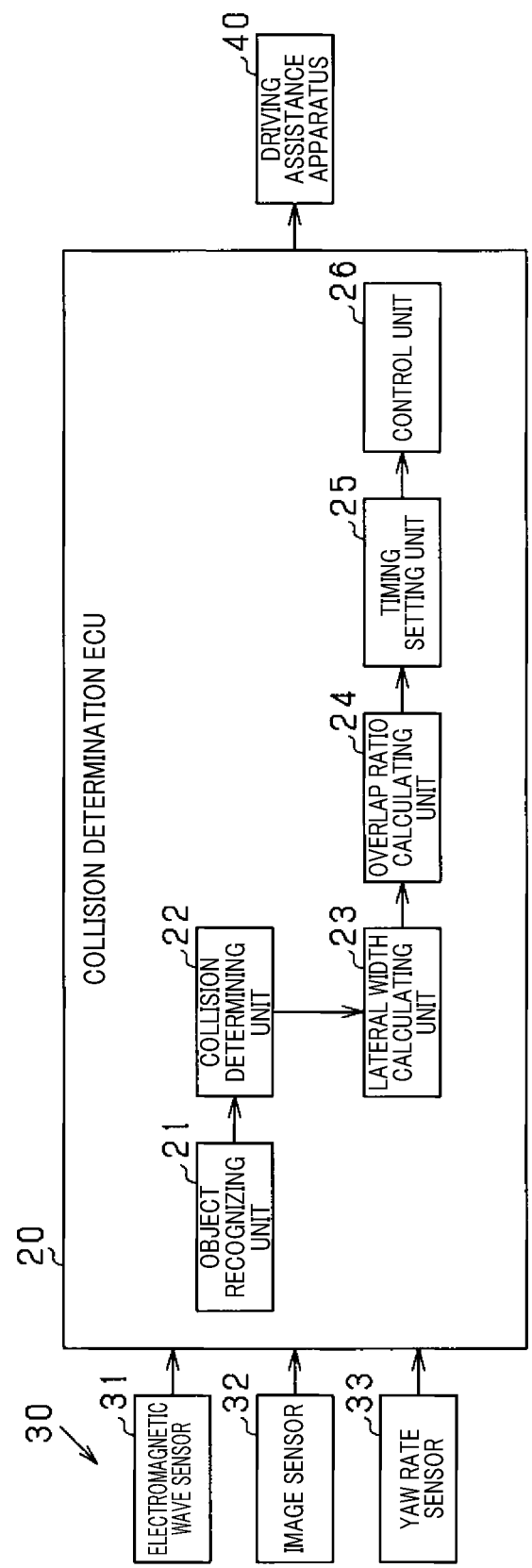
FIG. 1 is a configuration diagram of a vehicle control apparatus according to a first embodiment.

Embodiments of a vehicle control apparatus and a vehicle control method will hereinafter be described with reference to the drawings. Sections that are identical or equivalent to each other among the following embodiments are given the same reference numbers in the drawings. Descriptions of sections having the same reference numbers are applicable therebetween.

First Embodiment

A system 100 shown in FIG. 1 is mounted in a vehicle CS. The system 100 detects an object that is positioned ahead of the own vehicle CS. When a risk of collision between the object and the own vehicle CS is present, the system 100 performs an operation to avoid or mitigate the collision between the own vehicle CS and the object. According to the present embodiment, the system 100 includes various sensors 30, an electronic control unit (ECU) 20, and a driving assistance apparatus 40. The ECU 20 functions as the vehicle control apparatus.

The various sensors 30 are connected to the ECU 20. The various sensors 30 output detection results regarding objects to the ECU 20. In FIG. 1, the various sensors 30 include an electromagnetic wave sensor 31, an image sensor 32, and a yaw rate sensor 33. The image sensor 32 acquires a captured image. The yaw rate sensor 33 detects movement of the own vehicle CS in a lateral direction. In cases in which distinction is made between an object detected through use of the electromagnetic wave sensor 31 and an object detected through use of the image sensor 32, among objects to be detected, the object detected by the electromagnetic wave sensor 31 is referred to as an electromagnetic wave target and the object detected from a captured image is referred to as an image target.

The electromagnetic wave sensor 31 transmits transmission waves that have directionality, such as millimeter waves or radar waves. The electromagnetic wave sensor 31 then detects a position of an object and a relative speed of the object with reference to the own vehicle CS from reflected waves that are reflected from the electromagnetic wave target based on the transmission waves.

The image sensor 32 is disposed on a front side of the own vehicle CS, such that an imaging direction thereof faces ahead of the own vehicle CS. The image sensor 32 acquires a captured image that captures an area in front of the own vehicle CS and outputs the captured image to the ECU 20 at a predetermined cycle. The image sensor 32 is composed of image sensor elements, such as charge-coupled devices (CCDs), that are vertically and laterally arranged. The quantity of the image sensor elements depends on the resolution. The captured image acquired by the image sensor 32 is formed by pixels based on the resolution of the image sensor 32. According to the present embodiment, the image sensor 32 is described as being a single-lens camera. However, a stereo camera may also be used.

The ECU 20 is configured as a known computer that includes a central processing unit (CPU), a read-only memory (ROM), a random access memory (RAM), and the like. Functions for performing recognition of a position of an object ahead of the own vehicle CS and collision avoidance control to avoid a collision with the recognized object are actualized by the CPU running a program stored in the ROM.

Next, among the functions provided by the ECU 20, functions related to the collision avoidance control will be described.

Figure 2:
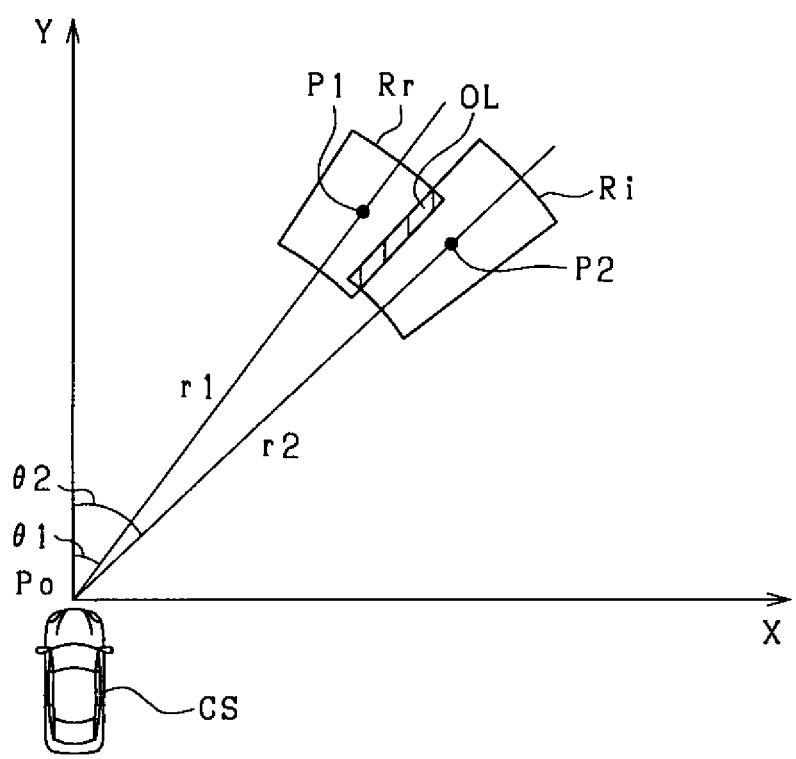
FIG. 2 is a diagram for explaining a determination made regarding whether or not objects are a same object in the first embodiment.

The ECU 20 acquires a first position PI and a second position P2. The first position P1 is a position of an object ahead of the own vehicle CS that is detected by the electromagnetic sensor 31. The second position P2 is a position of an object detected from a captured image captured by the image sensor 32. As shown in FIG. 2, the ECU 20 acquires the first position P1 and the second position P2 as positions on an XY plane. On the XY plane, a lateral direction of the own vehicle CS is an X-axis direction and a direction in which an imaging axis of the image sensor 32 extends is a Y-axis direction. On the XY plane in FIG. 2, of a tip end position of the own vehicle CS, a position in which the electromagnetic wave sensor 31 is provided is set as a reference point Po.

The first position P1 includes a first distance r1 from the own vehicle CS to the object and a first azimuth θ1 with reference to the own vehicle CS. The first distance r1 is acquired as a linear distance from the own vehicle CS to the object. In addition, the first azimuth θ1 indicates an angle to the object with the Y axis serving as a reference axis.

The second position P2 includes a second distance r2 from the own vehicle CS to the object and a second azimuth θ2 reference to the own vehicle CS. The second distance r2 is acquired as a linear distance from the own vehicle CS to the object. In addition, the second azimuth θ2 indicates an angle to the object with the Y axis serving as the reference axis. According to the present embodiment, the ECU 20 recognizes an object from the captured image by a template matching process using a dictionary that is registered in advance. In the dictionary, templates for the overall object are prepared for each type of object. The ECU 20 then calculates the second position P2 of the object based on a ratio of a length from a position on a lower end of the object recognized in the captured image to a lower end of the captured image and a length from a focus of expansion (FOE) calculated in advance in the captured image to the lower end of the captured image.

An object recognizing unit 21 determines whether or not objects are a same object based on the acquired first position P1 and second position P2. According to the present embodiment, the object recognizing unit 21 determines that the electromagnetic wave target and the image target are the same object when an overlapping area OL is present between an electromagnetic wave search area Rr and an image search area Ri. The electromagnetic wave search area Rr is set based on the first position P1. The image search area Ri is set based on the second position P2.

As shown in FIG. 2, the electromagnetic wave search area Rr is an area that is given a width that corresponds to an amount of expected error in each of a distance direction and an azimuth direction, with reference to the first position P1. The amounts of expected error are set in advance based on characteristics of the electromagnetic sensor 31. For example, the object recognizing unit 21 sets an area that is extended by the amount of expected error in the distance direction and the amount of expected error in the angle of the azimuth direction from the first position P1 (r1,θ1) as the electromagnetic wave search area Rr.

The image search area Ri is an area that is given a width that corresponds to an amount of expected error in each of the distance direction and the azimuth direction, with reference to the second position P2. The amounts of expected error are set in advance based on characteristics of the image sensor 32. For example, in FIG. 2, the object recognizing unit 21 sets an area that is extended by the amount of expected error in the distance direction and the amount of expected error in the angle of the azimuth direction from the second position P2 (r2, θ2) as the image search area Ri.

A collision determining unit 22 determines a likelihood of a collision between the own vehicle CS and the object of which the position has been recognized by the object recognizing unit 21. The collision determining unit 22 determines whether or not the object will collide with the own vehicle CS based on a merging position of the objects that are recognized as being the same object by the object recognizing unit 21. According to the present embodiment, the collision determining unit 22 calculates the merging position by combining the first distance r1 of the first position P1 that has high accuracy and the second azimuth θ2 of the second position P2 that has high accuracy. The collision determining unit 22 calculates a movement trajectory of the object based on a plurality of differing merging positions in time series. Then, when a line segment obtained by extending the movement trajectory towards the own vehicle CS intersects with a front face of the own vehicle CS, the collision determining unit 22 determines that the likelihood of a collision between the object and the own vehicle CS is present.

A lateral width calculating unit 23 calculates an object width W from the captured image when the collision determining unit 22 determines that the likelihood of a collision between the object and the own vehicle CS is present. The object width W indicates a size of the object in the lateral direction. According to the present embodiment, the lateral width calculating unit 23 detects edge points of the object from the captured image and recognizes a contour of the object based on the edge points. For example, the lateral width calculating unit 23 extracts the contour of the object from the edge points using known template matching. Then, the ECU 20 calculates the object width W indicating the size of the object in the lateral direction from a left end position and a right end position within the recognized contour of the object.

When the image sensor 32 outputs, to the ECU 20, a width angle that indicates a difference in azimuth angle between a left end portion and a right end portion of the object in the X-axis direction as the second position P2, the ECU 20 may calculate the object width W in a following manner. That is, in this case, the ECU 20 calculates the object width W using the width angle acquired from the image sensor 32 and the distance between the own vehicle CS and the object. The first distance r1 that has high accuracy can be used as the distance between the own vehicle CS and the object.

Figure 3:
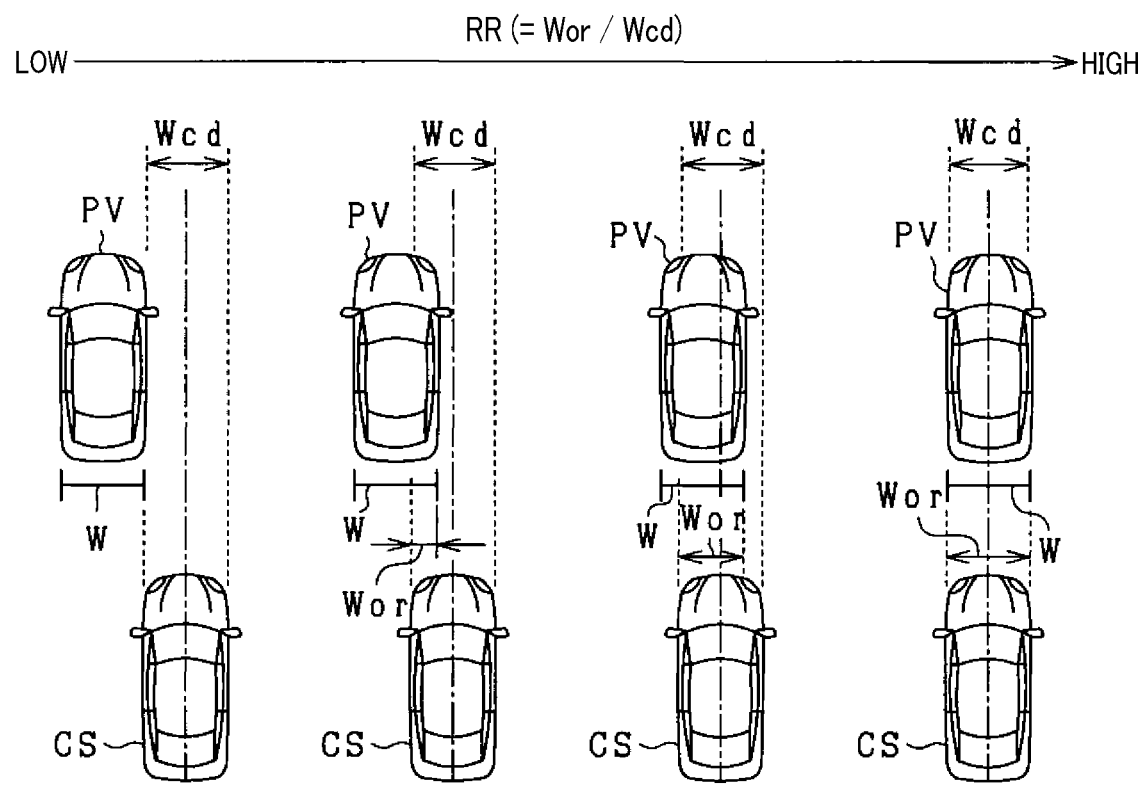
FIG. 3 is a diagram for explaining a lap ratio in the first embodiment.

An overlap ratio calculating unit 24 calculates an overlap ratio in the lateral direction between the calculated object width W and a determination area Wcd as a lap ratio RR. The determination area Wcd is virtually set ahead of the own vehicle CS. As shown in FIG. 3, the lap ratio RR indicates the proportion of the length over which the object width W and the determination area Wcd overlap in the lateral direction. The determination area Wcd is an area that is virtually set ahead of the own vehicle CS and extended in the lateral direction by a predetermined length. According to the present embodiment, a lateral width of the front face of the own vehicle CS is set as the determination area Wcd. The ECU 20 calculates the lap ratio RR using the object width W that overlaps with the determination area Wcd.

According to the present embodiment, the overlap ratio calculating unit 24 calculates the lap ratio RR using an expression (1), below.

$$RR = Wor/Wcd \quad (1)$$

Here, Wor denotes the length of overlap with the determination area Wcd in the X-axis direction when the position of the object width W is set with reference to a center position of the object in the lateral direction.

For example, as shown in FIG. 3, in a state in which a preceding vehicle PV is present ahead of the own vehicle CS, when the vehicle width (determination area Wcd) of the own vehicle CS and the object width W of the preceding vehicle PV overlap, the risk of collision changes based on the lap ratio RR. That is, in FIG. 3, the risk of collision decreases as the lap ratio RR between the own vehicle CS and the preceding vehicle PV decreases (towards the left side in FIG. 3). Meanwhile, the risk of collision increases as the lap ratio RR between the own vehicle CS and the preceding vehicle PV increases.

A timing setting unit 25 sets an operation timing for the collision avoidance control based on the lap ratio RR calculated by the overlap ratio calculating unit 24. According to the present embodiment, an operation threshold is set based on the lap ratio RR. The operation timing for the collision avoidance control is set based on the operation threshold. Specifically, because less urgency is required regarding the timing of an avoidance operation performed by a driver as the lap ratio RR decreases and the risk of collision decreases, the operation threshold is set to a greater value as the lap ratio RR decreases. Meanwhile, because greater urgency is required regarding the timing of the avoidance operation performed by the driver as the lap ratio RR increases and the risk of collision increases, the operation threshold is set to a smaller value as the lap ratio RR increases.

A control unit 26 performs the collision avoidance control to avoid collision with the object ahead of the own vehicle CS. The control unit 26 compares the operation threshold set by the timing setting unit 25 and a time-to-collision (TTC). When the TTC is greater than the operation threshold, the control unit 26 performs the collision avoidance control. The TTC is an evaluation value that indicates the number of seconds to collision if the own vehicle CS continues to travel at a current own-vehicle speed.

The driving assistance apparatus 40 is a warning apparatus that issues a warning sound to the driver or a brake apparatus that decelerates the vehicle speed of the own vehicle CS. When the likelihood of an object colliding with the own vehicle CS is present, the driving assistance apparatus 40 performs various operations to avoid collision with the object. In cases in which the driving assistance apparatus 40 is the brake apparatus, the driving assistance apparatus 40 operates automatic braking when the TTC is less than the operation threshold. In addition, in cases which the driving assistance apparatus 40 is the warning apparatus, the driving assistance apparatus 40 issues the warning sound when the TTC is less than the operation threshold.

Figure 4:
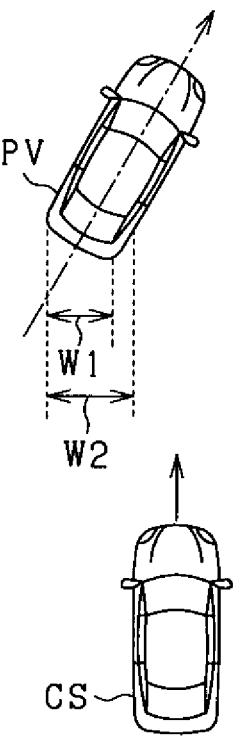
FIG. 4 is a diagram for explaining, as an example, a state in which an error in object width occurs in the first embodiment.

Here, when an error is present in the object width W detected from the object ahead of the own vehicle CS, the lap ratio RR that is calculated by the ECU 20 changes. FIG. 4 shows a state in which the own vehicle CS and the preceding vehicle PV are present on a traveling road, and an attitude of the preceding Vehicle PV in relation to an advancing direction of the own vehicle CS is slanted in the X-axis direction. When the size of a rear face of the preceding vehicle PV in the X-axis direction is calculated as the object width W, the ECU 20 may calculate the object width W to be greater than an actual value as a result of the azimuth of the preceding vehicle PV being slanted at a predetermined angle from the advancing direction of the own vehicle CS.

In the example in FIG. 4, the ECU 20 calculates an area including a portion of a side face of the preceding vehicle PV from the captured image as an object width W2. As a result, the object width W2 is greater than an actual object width W1 of the preceding vehicle PV. For example, as a result of a characteristic pattern, shape, or the like that forms edge points being present on the side face of the preceding vehicle PV, the ECU 20 may erroneously detect an area that includes the side face as the object width W. In addition, in cases in which brake lamps are turned on, when the ECU 20 recognizes an area that includes light spreading around the brake lamps as the rear face of the object (preceding vehicle PV), the ECU 20 may calculate the object width W to be greater than the actual length of the rear face of the preceding vehicle PV.

As a result of the object width W being detected such as to be greater than the actual object width, the lap ratio RR increases and the setting of the operation tuning for the collision avoidance control may be affected. For example, as a result of the operation threshold being changed, the operation timing for the collision avoidance control may be made earlier for an object of which the risk of collision with the own vehicle CS is actually low. Consequently, an unnecessary operation of the collision avoidance control may occur. Therefore, according to the present embodiment, when the object width W is less than a predetermined threshold, the timing setting unit 25 sets the object width W to be less than the object width W when the object width W is greater than the predetermined threshold. As a result, effects that the error in the object width W has on collision determination can be reduced. The operation timing for the collision avoidance control can be appropriately set.

Next, a vehicle control method regarding an object that is performed by the ECU 20 will be described with reference to FIG. 5. The ECU 20 performs the processes shown in FIG. 5 at a predetermined cycle. In addition, an example in which the preceding vehicle PV that is positioned ahead of the own vehicle CS is to be detected is described.

At step S11, the ECU 20 performs a determination regarding whether or not objects are the same object. According to the present embodiment, when the overlapping area OL is present between the image search area Ri set based on the first position P1 and the electromagnetic wave search area Rr set based on the second position P2, the ECU 20 determines that the image target and the electromagnetic wave target are the same object. Step S11 functions as an object recognition step.

When determined that the image target and the electromagnetic wave target are the same object (YES at step S11), the ECU 20 proceeds to step S12. Meanwhile, when determined that the image target and the electromagnetic wave target are not the same object (NO at step S11), the ECU 20 temporarily ends the processes in FIG. 5.

At step S12, the ECU 20 counts a number of consecutive same-object determinations N made at S11. The number of consecutive same-object determinations N indicates the number of times that the image target and the electromagnetic wave target are determined to be the same object at step S11. According to the present embodiment, the ECU 20 determines whether or not the same-object determination is consecutively made regarding the same object by using a degree of similarity between the image target previously determined to be the same object as the electromagnetic wave target and the image target currently determined to be the same object as the electromagnetic wave target.

At step S13, the ECU 20 determines the likelihood of a collision between the object and the own vehicle CS. When determined that the likelihood of a collision is not present (NO at step S13), the ECU 20 temporarily ends the processes in FIG. 5. Meanwhile, when determined that the likelihood of a collision is present (YES at step S13), the ECU 20 proceeds to step S14. Step S13 functions as a collision determination step.

At step S14, the ECU 20 calculates the object width W from the preceding vehicle PV included in the captured image. According to the present embodiment, the ECU 20 calculates the object width W that indicates the size of the preceding vehicle PV in the X-axis direction using a dictionary for recognizing the rear face of the preceding vehicle PV. Step S14 functions as a lateral width calculation step.

At step S15, the ECU 20 calculates the lap ratio RR using the object width W calculated at step S14. The ECU 20 calculates the lap ratio RR using the above-described expression (1). Step S15 functions as an overlap ratio calculation step.

Figure 6:
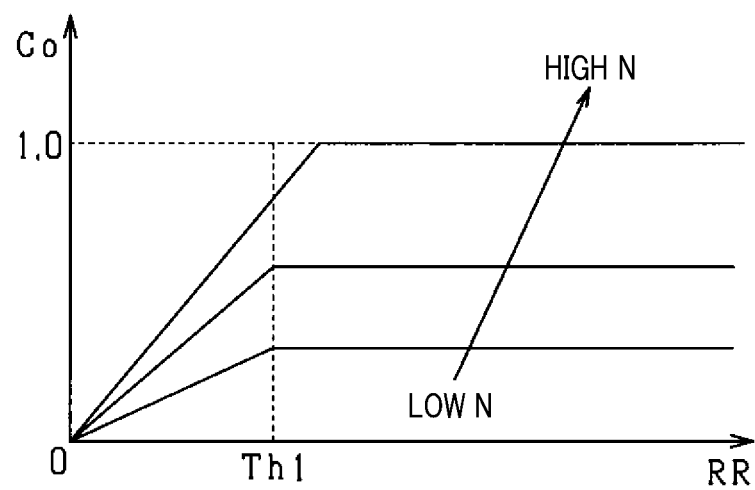
FIG. 6 is a graph in which a horizontal axis indicates a lap ratio and a vertical axis indicates correction coefficient in the first embodiment.

At step S16, the ECU 20 calculates a correction coefficient Co for changing the object width W from an initial object width W0. FIG. 6 is a graph in which a horizontal axis indicates the lap ratio RR and a vertical axis indicates the correction coefficient Co. According to the present embodiment, the correction coefficient Co is prescribed as a value that is equal to or greater than 0 and equal to or less than 1, and indicates a reduction ratio from the initial object width W0.

In addition, the value of the correction coefficient Co is prescribed such that the reduction ratio in relation to the initial object width W0 decreases as the lap ratio RR decreases, when the lap ratio RR is less than a threshold Th1. Furthermore, the value of the correction coefficient Co is prescribed such as to be fixed even when the lap ratio RR increases, when the lap ratio RR is greater than the threshold Th1. According to the present embodiment, a map that prescribes the relationship between the lap ratio RR and the correction coefficient Co shown in FIG. 6 is recorded in the ECU 20. The ECU 20 calculates the correction coefficient Co with reference to the map.

The threshold Th1 is set based on the value of a lap ratio RR that is highly likely to affect the setting of the operation threshold as a result of variations in the lap ratio RR when an error is present in the object width W. According to the present embodiment, the threshold Th1 is set based on an object width W at which, when the preceding vehicle PV and the own vehicle CS have a positional relationship in which the preceding vehicle 1W and the own vehicle CS will not collide in the X-axis direction, an unnecessary operation of the collision avoidance control may occur as a result of the object width W being calculated to be greater than the actual object width.

In other words, the threshold Th1 is set based on a lap ratio RR at which an unnecessary operation of the collision avoidance control may occur as a result of the object width W of the preceding vehicle PV being calculated to be greater than the actual value, when the position in the X-axis direction of a side face of the preceding vehicle PV on the own vehicle CS side and the position in the X-axis direction of a side face of the own vehicle CS on the preceding vehicle PV side coincide. For example, a lap ratio RR that is equal to or greater than 0% and equal to or less than 20% is used as the threshold Th1.

In addition, during a period immediately following the same-object determination, the reliability of the same-object determination made by the ECU 20 is low and the error in the object width W may increase. Therefore, the ECU 20 calculates the correction coefficient Co such that the reduction ratio from the initial object width WO increases as the number of consecutive same-object determinations N acquired at step S12 increases. In FIG. 6, the correction coefficient Co is prescribed such that an object width Wad after change is less than the initial object width WO as the number of consecutive same-object determinations N decreases, even when the lap ratio RR is equal to or greater than the threshold Th1.

At step S17, the ECU 20 changes the object width W using the correction coefficient Co calculated at step S16. The ECU 20 changes the object width W using an expression (2), below.

$$Wad = WO \times Ad \quad (2)$$

Here, WO denotes the initial object width calculated at step S14. Wad denotes the object width after correction. Ad denotes the correction coefficient.

Figure 7:
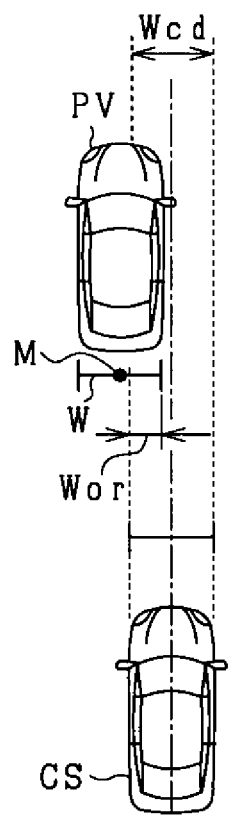
FIG. 7 is a diagram for explaining reduction of the object width in the first embodiment.
Figure 8:
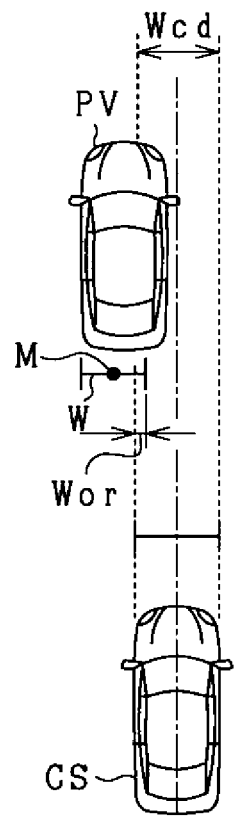
FIG. 8 is a diagram for explaining reduction of the object width in the first embodiment.

FIG. 7 shows the object width WO before change. FIG. 8 shows the object width Wad after change. In FIG. 7 and FIG. 8, to simplify the description, the lap ratio RR that is associated with the change in object width W is shown to be greater than the actual lap ratio RR. According to the present embodiment, based on the correction coefficient Co calculated at step S16, the ECU 20 uniformly reduces the object width W of the preceding vehicle PV from both the left and right sides with reference to a center position M in the X-axis direction. In addition, the ECU 20 may, of course, reduce the object width W only on the side closer to the own vehicle CS.

At step S18, the ECU 20 calculates the lap ratio RR using the object width Wad after correction. The ECU 20 calculates the lap ratio RR from the above-described expression (1) using the object width Wad after correction at step S17 and the determination area Wcd. According to the present embodiment, first, the ECU 20 sets the object width Wad after correction as a lateral width area that extends leftward and rightward with reference to the center position of the preceding vehicle PV. Then, the ECU 20 calculates a length included between the left end position and the right end position of the determination area Wcd in the X-axis direction within the lateral width area set using the object width Wad, as the length of overlap Wor. In addition, the ECU 20 calculates the center position in the lateral direction (X-axis direction) of the preceding vehicle PV from the merging position calculated based on the determination regarding whether or not objects are the same object that has been performed at step S11.

At step S19, the ECU 20 calculates the operation threshold using the lap ratio RR calculated at step S18. The value of the operation threshold is set such that the operation timing for the collision avoidance control is delayed as the lap ratio RR decreases. Steps S16 to S19 function as a timing setting step.

At step S20, the ECU 20 performs the collision avoidance control using the operation threshold calculated at step S19. Specifically, the ECU 20 calculates the TTC regarding the preceding vehicle PV and compares the TTC and the operation threshold. Then, when determined that the TTC is less than the operation threshold, the ECU 20 makes the driving assistance apparatus 40 perform automatic braking.

According to the present embodiment described in detail above, the following excellent effects can be achieved.

When the lap ratio RR is less than the threshold Th1, the ECU 20 changes the object width W such that the object width W is less than the object width W when the lap ratio RR is greater than the threshold Th1. Then, the ECU 20 calculates the new lap ratio RR between the object width Wad after change and the determination area Wcd. Based on the new lap ratio RR, the ECU 20 sets the operation timing for the collision avoidance control performed on the own vehicle to avoid a collision with the object.

In this case, the ECU 20 uses the threshold Th1 to differentiate between a lap ratio RR at which the operation timing for the collision avoidance control is easily affected by an error in the object width W and a lap ratio RR at which the operation timing for the collision avoidance control is not easily affected by the error. The ECU 20 reduces the object width W when the lap ratio RR is equal to or less than the threshold Th1. In addition, when the lap ratio RR is equal to or greater than the threshold Th1 and the operation timing for the collision avoidance control is not easily affected h the error in the object width W, the ECU 20 does not change the object width W. As a result, the setting f the operation timing based on the initial lap ratio RR is prioritized. Consequently, the collision avoidance control can be performed at an appropriate timing as a result of the effects that the error in the object width W have on the operation timing for the collision avoidance control being suppressed.

Under a condition that the objects ahead of the own vehicle are determined to be the same object, when the determination regarding a collision with the object is performed, the reliability of the same-object determination regarding the object may be low during a period immediately after the same-object determination. The error in the object width W may increase. In this regard, the ECU 20 increases the reduction ratio of the object width W as the number of consecutive same-object determinations N increases. In this case, during the period in which the reliability level of the same-object determination is low, the object width W is calculated such as to be smaller As a result, an unnecessary operation regarding an object being performed when an erroneous determination is made can be prevented. Meanwhile, during a period in which the reliability of the same-object determination is high, the reduction ratio of the object width W is increased. As a result, calculation accuracy of the lap ratio RR can be prioritized. The accuracy of collision determination can be improved.

Even when the number of consecutive same-object determinations N increases, when the calculated lap ratio RR is equal to or less than the threshold Th1, the ECU 20 changes the reduction ratio such that the object width Wad after change does not become greater than the initial object width WO. In this case, based on the increase in the number of consecutive same-object determinations N, the object width Wad can be prevented from becoming greater than the initial object width WO. The lap ratio RR can be appropriately calculated.

Second Embodiment

Configurations according to a second embodiment that differ from those according to the first embodiment will mainly be described. According to the second embodiment, the ECU 20 reduces a speed of increase in the reduction ratio from the initial object width WO based on the increase in the number of consecutive same-object determinations N as the lap ratio RR decreases.

Figure 9:
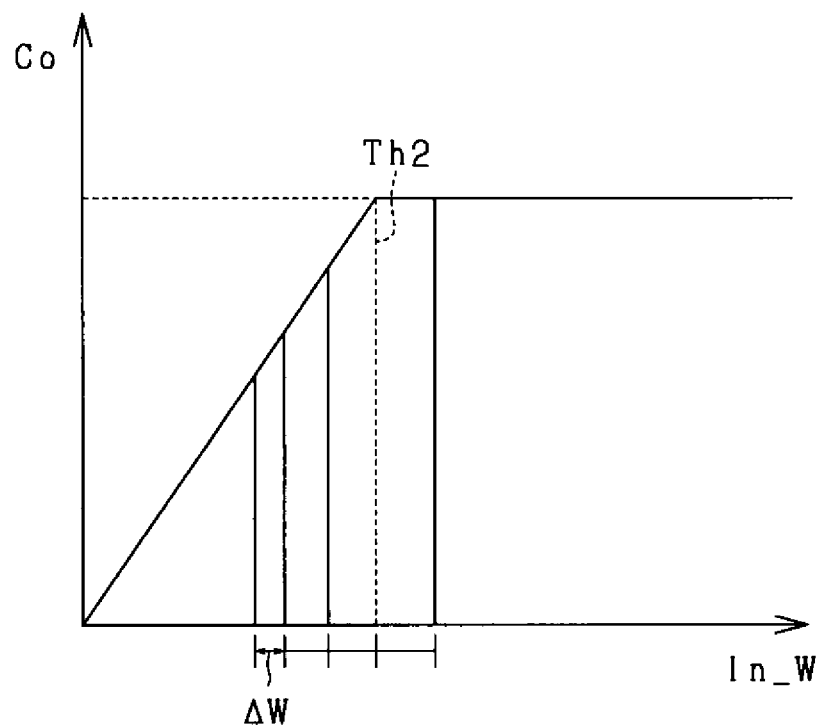
FIG. 9 is a graph for explaining a correction coefficient according to a second embodiment.

First, the correction coefficient Co according to the second embodiment will be described with reference to FIG. 9. FIG. 9 shows a graph in which a horizontal axis indicates a width coefficient index In_w and a vertical axis indicates the correction coefficient Co. According to the present embodiment, a map that prescribes the relationship between the width coefficient index In_w and the correction coefficient Co shown in FIG. 9 is recorded in the ECU 20. The ECU 20 calculates the correction coefficient Co on the map by changing the width coefficient index In w based on the lap ratio RR.

The width coefficient index In_w is a value used to determine a reference position of the correction coefficient Co. The value of the width coefficient index In_w increases based on the increase in the number of consecutive same-object determinations N. Therefore, as the number of consecutive same-object determinations N increases, the width coefficient index In_w increases. The calculated correction coefficient Co becomes greater.

The value of the correction coefficient Co is prescribed such that the reduction ratio from the initial object width WO decreases when the width coefficient index In_w is less than a threshold Th2. In addition, when the width coefficient index In_w is greater than the threshold Th2, the value of the correction coefficient Co is prescribed such as to be fixed even when the width coefficient index In_w increases.

Figure 5:
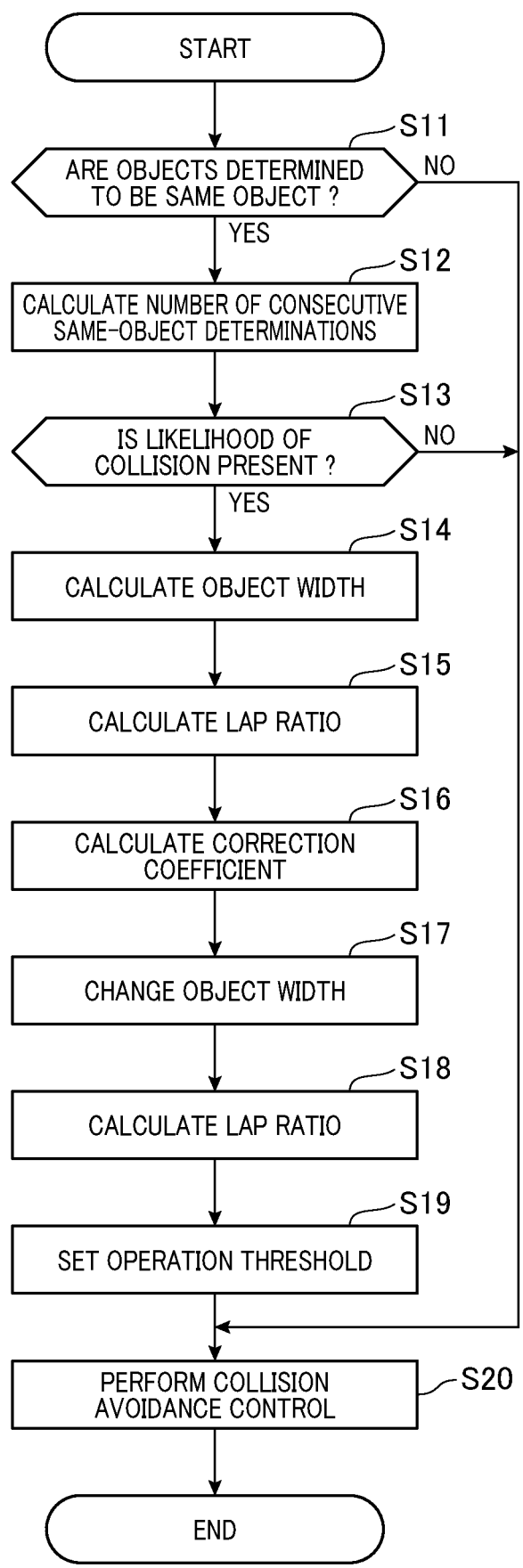
FIG. 5 is a diagram for explaining a vehicle control method regarding an object performed by an electronic control unit (ECU) in the first embodiment.
Figure 10:
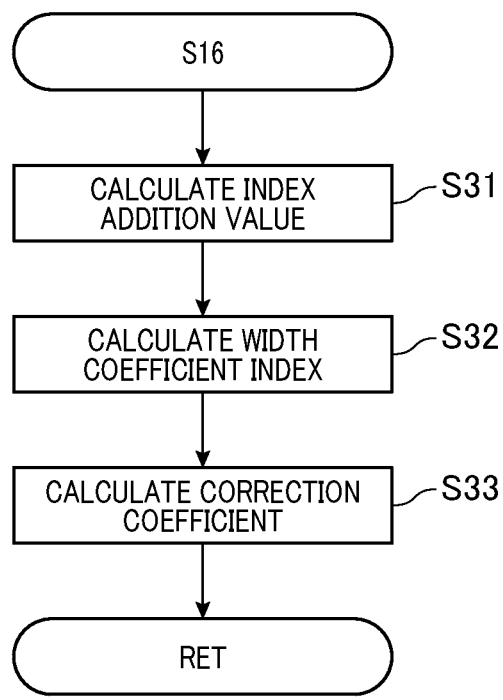
FIG. 10 is a flowchart for explaining a process at step S16 in FIG. 6, according to the second embodiment.

FIG. 10 shows a flowchart for explaining the process at step S16 in FIG. 5 according to the second embodiment. According to the second embodiment as well, an example in which the object width W is changed every time the number of consecutive same-object determinations N increases is described.

First, at step S31, the ECU 20 calculates an index addition value Add based on the lap ratio RR. The index addition value Add is a value that indicates an amount of increase in the width coefficient index In_w based on the increase in the number of consecutive same-object determinations N. Therefore, the amount of increase in the width coefficient index In_w decreases as the index addition value Add decreases. The speed of increase in the correction coefficient Co decreases. In addition, the amount of increase in the width coefficient index In_w increases as the index addition value Add increases. The speed of increase in the correction coefficient Co increases.

Figure 11:
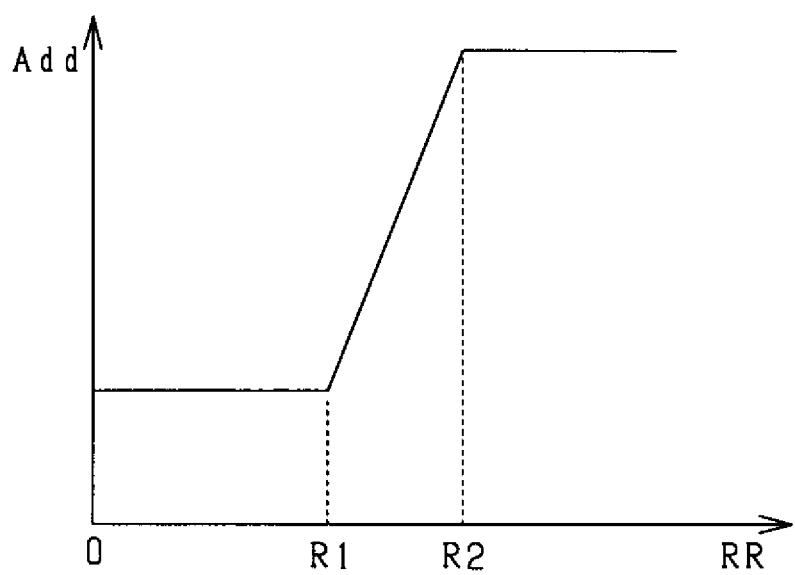
FIG. 11 is a graph for explaining an index addition value.

FIG. 11 is a graph in which a horizontal axis indicates the lap ratio RR and a vertical axis indicates the index addition value Add. The index addition value Add shown in FIG. 11 is prescribed such that the value decreases as the lap ratio RR decreases. In other words, the speed of increase in the correction coefficient Co that indicates the reduction ratio of the object width W decreases as the lap ratio RR decreases. In addition, when the lap ratio RR ranges from 0 to R1, the index addition value Add is fixed. When the lap ratio RR ranges from R1 to R2, the index addition value Add monotonically increases based on the increase in the lap ratio RR. Moreover, when the lap ratio RR is equal to or greater than R2, the index addition value Add becomes a fixed value.

At step S32, the ECU 20 calculates the width coefficient index In_w using the index addition value Add calculated at step S31. The ECU 20 calculates the width coefficient index In_w using an expression (3), below $$\text{In\_}w(i)=\text{In\_}w(i-1)+\text{Add} \qquad (3)$$

Here, i denotes the number of consecutive same-object determinations and is an integer of 1 or greater. In addition, In_w(i) denotes the width coefficient index calculated when the same-object determination has been consecutively made an i number of times.

Therefore, as shown in FIG. 9, an amount of increase Δw from the position of an n-1th width coefficient index In_w (n−1) to the position of an nth width coefficient index In_w(n) is the index addition value Add calculated based in the lap ratio RR. Here, the speed of increase in the correction coefficient Co is prescribed by a width from a previous index addition value Add to a current index addition value Add. Therefore, the speed of increase in the correction coefficient Co is determined based on the lap ratio RR, At step S33, the ECU 20 calculates a correction value corresponding to the width coefficient index In_w calculated at step S32. According to the present embodiment, the ECU 20 calculates the correction coefficient Co corresponding to the width coefficient index In_w calculated at step S32 using the map in FIG. 9.

Upon completing the process at step S33, at step S17 in FIG. 5, the ECU 20 corrects the object width W using the calculated correction coefficient Co.

According to the present embodiment described in detail above, the following excellent effects can be obtained.

The ECU 20 calculates the amount of increase in the reduction ratio from the initial object width WO that is based on the increase in the number of consecutive same-object determinations N, based on the lap ratio RR. The ECU 20 reduces the speed of increase in the reduction ratio as the lap ratio RR decreases. In this case, when the lap ratio RR is low, the ECU 20 reduces the speed of increase in the correction coefficient Co based on the increase in the number of consecutive same-object determinations N, compared to that when the lap ratio RR is high. As a result, the effects of an error the object width W can be reduced. In addition, the ECU 20 can calculate the correction coefficient Co based on the increase in the number of consecutive same-object determinations N using a single map for calculating the correction coefficient Co. Therefore, memory capacity required by the ECU 20 can be reduced.

Third Embodiment

Configurations according to a third embodiment that differ from those according to the second embodiment will mainly be described. According to the third embodiment, when a determination is made that a state is such that the distance in the lateral direction (vehicle width direction) from the own vehicle CS to the preceding vehicle PV increases, the object width W is reduced compared to that when the state is not such that the distance in the lateral direction from the own vehicle CS to the preceding vehicle PV increases. Here, the state in which the distance in the lateral direction from the own vehicle CS to the preceding vehicle PV increases includes cases in which the preceding vehicle PV is moving away from the own vehicle CS in the lateral direction and cases in which the own vehicle CS is moving away from the preceding vehicle PV in the lateral direction.

Figure 12:
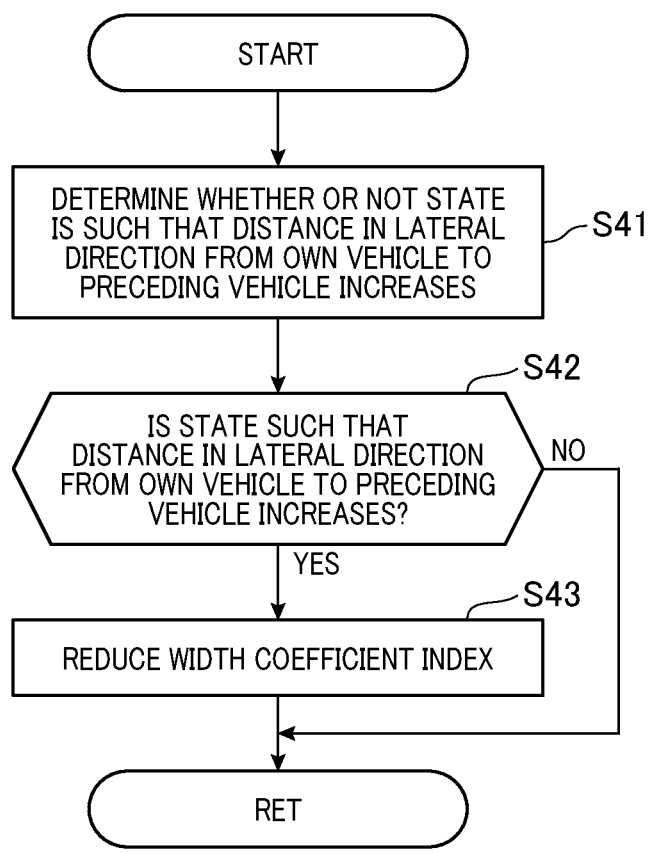
FIG. 12 is a flowchart for explaining processes performed by an electronic control unit (ECU) according to a third embodiment.

FIG. 12 is a flowchart for explaining a process performed by the ECU 20 according to the third embodiment. The ECU 20 performs the process shown in FIG. 12 at a predetermined cycle.

At step S41, the ECU 20 determines whether or not the state is such that the distance in the lateral direction between the own vehicle and the preceding vehicle increases. The ECU 20 determines whether or not the state is such that the distance in the lateral direction between the own vehicle and the preceding vehicle increases by combining detection of changes in the position of the own vehicle CS in the lateral direction based on the output from the yaw rate sensor 33 and detection of changes in the position of the preceding vehicle PV in captured images. Step S41 functions as a state determining unit.

Figure 13:
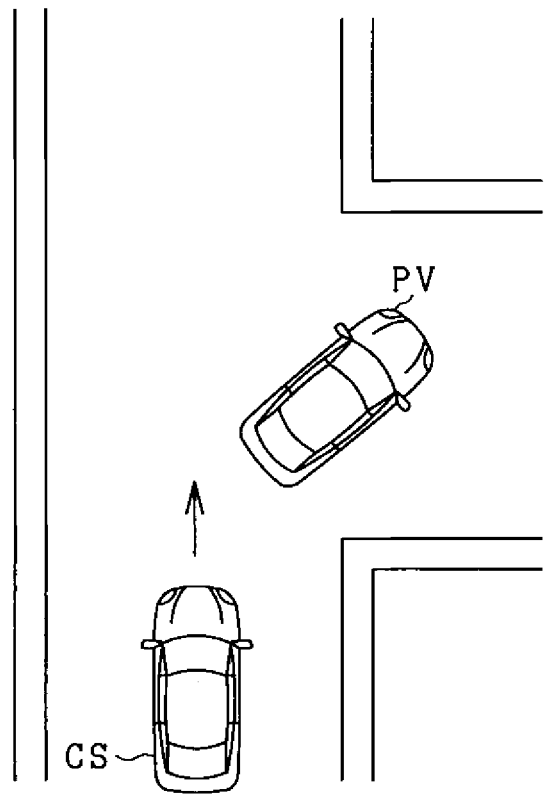
FIG. 13 is a diagram for explaining a state in which a distance in a lateral direction from an own vehicle to a preceding vehicle increases.
Figure 14:
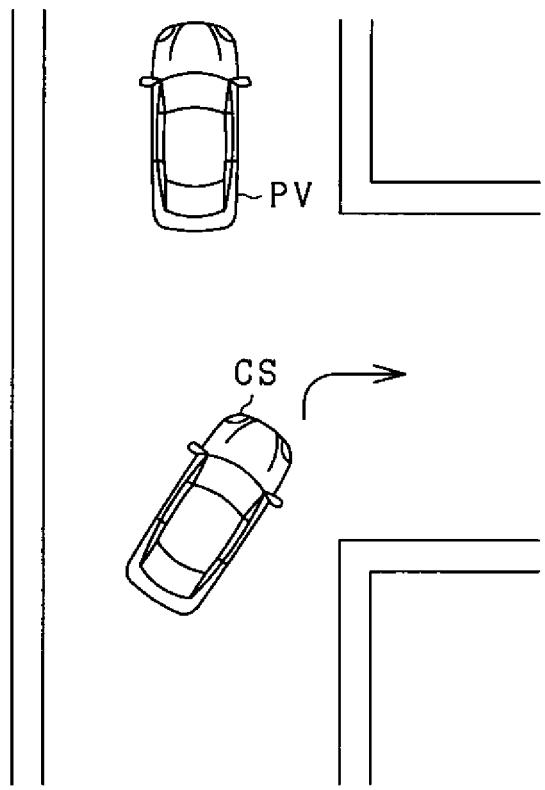
FIG. 14 is a diagram for explaining a state in which the distance in the lateral direction from the own vehicle to the preceding vehicle increases.

For example, as shown in FIG. 13, when the own vehicle CS is determined to be traveling straight ahead based on the output from the yaw rate sensor 33 and illumination of a turn signal of the preceding vehicle PV is detected, the ECU 20 determines that the state is such that the distance in the lateral direction from the own vehicle CS to the preceding vehicle PV increases as a result of the preceding vehicle PV making a left or right turn in the near future. In addition, as shown in FIG. 14, when the own vehicle CS is determined to be turning towards a lateral direction based on the output from the yaw rate sensor 33, and the position of the preceding vehicle 1W in the captured images is changing in the lateral direction, the ECU 20 determines that the state is such that the distance in the lateral direction from the own vehicle CS to the preceding vehicle PV increases as a result of the own vehicle CS making a left or right turn.

When determined that the preceding vehicle PV is stopped and changes in the curvature of a lane marking is significant, the ECU 20 may determine that the own vehicle CS is traveling on a curved road. The ECU 20 may thereby determine that the state is such that the distance in the lateral direction from the own vehicle CS to the preceding vehicle PV increases.

When determined that the state is such that the distance in the lateral direction from the own vehicle CS to the preceding vehicle PV increases (YES at step S42), at step S43, the ECU 20 reduces the width coefficient index In_from a current value. As a result, the speed of increase in the correction coefficient Co based on the increase in the number of consecutive same-object determinations N is reduced compared to that when the state is not determined to be such that the distance in the lateral direction from the own vehicle CS to the preceding vehicle PV increases. Consequently, the correction coefficient Co can be more easily maintained at a small value. The object width W does not easily increase.

Meanwhile, when determined that the state is not such that the distance in the lateral direction from the own vehicle CS to the preceding vehicle PV increases (NO at step S42), the ECU 20 temporarily ends the processes shown in FIG. 12.

According to the present embodiment described in detail above, the following excellent effects can be obtained.

In a state in which the distance in the lateral direction from the own vehicle CS to the preceding vehicle PV increases, the likelihood of a collision decreases compared to when the preceding vehicle PV and the own vehicle CS are moving in the same direction. In this regard, in the above-described configuration, when determined that the state is such that the distance in the lateral direction from the own vehicle CS to the preceding vehicle PV increases, the ECU 20 reduces the object width W compared to that when determined that the state is not such that the distance in the lateral direction from the own vehicle CS to the preceding vehicle PV increases. In this case, the object width is reduced when the likelihood of a collision between the preceding vehicle PV and the own vehicle CS is low. Consequently, the operation timing for the collision avoidance control can be delayed and an unnecessary operation of the collision avoidance control can be suppressed.

Fourth Embodiment

Configurations according to a fourth embodiment that differ from those according to the first to third embodiments will mainly be described.

Figure 15:
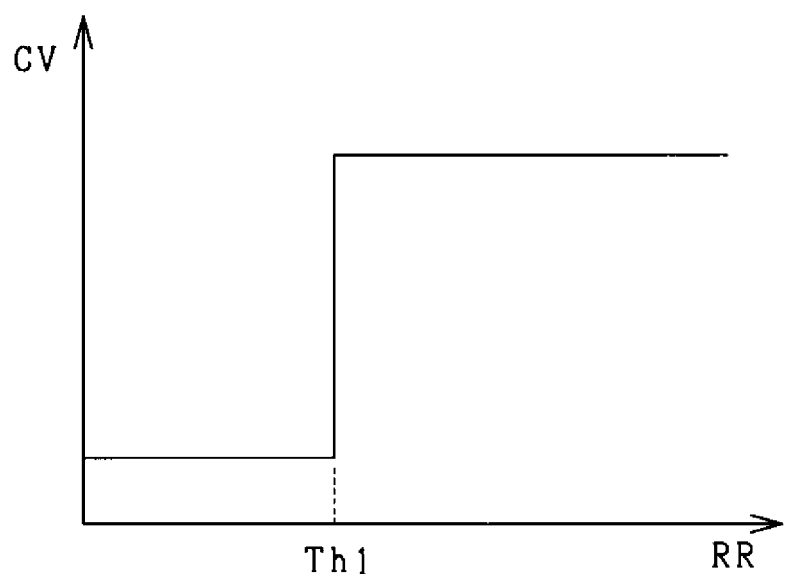
FIG. 15 is a graph in which a horizontal axis indicates lap ratio and a vertical axis indicates correction coefficient, according to a fourth embodiment.

According to the fourth embodiment, the ECU 20 reduces the object width W at the same reduction ratio when the lap ratio RR is less than the predetermined threshold Th1. FIG. 15 is a graph in which a horizontal axis indicates the lap ratio RR and a vertical axis indicates the correction coefficient Co. The value of the correction coefficient Co is prescribed such that the reduction ratio from the initial object width W is the same value when the lap ratio RR is less than the threshold Th1.

Therefore, at step S16 in FIG. 5, the ECU 20 calculates the correction coefficient Co with reference to a map shown in FIG. 15.

Other Embodiments

The vehicle control apparatus may determine a collision between an object and the own vehicle CS using the detection results from the image sensor 32. In this case, the vehicle control apparatus is configured to include only the image sensor 32.

According to the third embodiment, at step S41, the ECU 20 may determine whether or not the state is such that the distance in the lateral direction from the own vehicle CS to the preceding vehicle PV increases, using a known optical flow The optical flow indicates a vector field of pixels corresponding to the preceding vehicle PV in the captured image. Changes in relative position in the lateral direction can be calculated as a size of a vector that extends to the side opposite the own vehicle in the lateral direction in the optical flow of the preceding vehicle PV. Therefore, the ECU 20 can determine whether or not the state is such that the distance in the lateral direction from the own vehicle CS to the preceding vehicle PV increases, by comparing the size of the vector with a threshold.

As the method for determining whether or not objects are the same object, a following method may also be used. A first TTC is calculated as a margin time until the electromagnetic wave target collides with the own vehicle CS based on the first position P1. In addition, a second TTC is calculated as a margin time until the image target collides the own vehicle CS based on the second position P2.

Then, at step S11 in FIG. 5, when a difference between the calculated first TTC and the calculated second TTC is equal to or less than a threshold, the electromagnetic wave target and the image target are determined to be the same object, in addition, the condition that the difference between the calculated first TTC and the calculated second TTC is equal to or less than the threshold, and the condition that the overlapping area OL is present between the electromagnetic wave search area Rr and the image search area Ri may both serve as conditions for determining that the objects are the same object.

The correction coefficient Co that is changed based on the increase in the number of consecutive same-object determinations N may also be changed when the increase in the number of consecutive same-object determinations N reaches a plurality of times, in addition to every time an increase in the number of consecutive same-object determinations N occurs.

The object of which the object width is calculated may be a pedestrian or a two-wheeled vehicle, instead of the vehicle.

The ECU 20 may change the intensity of each operation in the collision avoidance control based on the lap ratio RR, in addition to changing the operation threshold based on the lap ratio RR. In this case, the ECU 20 reduces the braking force of automatic braking or reduces the volume of the warning sound, as the lap ratio RR decreases.

What is claimed is:

1. A vehicle control apparatus that performs collision avoidance control to avoid a collision with an object ahead of an own vehicle, the vehicle control apparatus comprising:
   an object recognizing unit that recognizes at least a position of the object based on a captured image in which an area ahead of the own vehicle is captured by an image sensor;
   a collision determining unit that determines a likelihood of a collision between the own vehicle and the object of which the position is recognized;
   a lateral width calculating unit that calculates an object width indicating a size of the object in a lateral direction, based on the captured image, when the likelihood of a collision between the object and the own vehicle is determined to be present;
   an overlap ratio calculating unit that calculates an overlap ratio indicating a proportion of an amount of overlap in the lateral direction between the calculated object width and a determination area that is virtually set ahead of the own vehicle; and
   a timing setting unit that sets an operation timing for the collision avoidance control based on the calculated overlap ratio, wherein
   the timing setting unit changes the object width when the overlap ratio is less than a predetermined threshold such that the object width is less than the object width when the overlap ratio is greater than the predetermined threshold, and sets the operation timing for the collision avoidance control based on a new overlap ratio calculated based on the determination area and the object width after change.

2. The vehicle control apparatus according to claim 1, wherein:
   the timing setting unit reduces the object width as the calculated overlap ratio decreases, when the overlap ratio is less than the predetermined threshold.

3. The vehicle control apparatus according to claim 2, wherein:
   the object recognizing unit uses the position of the object detected based on the captured image in which the area ahead of the own vehicle is captured by the image sensor and a position of an object detected by an electromagnetic wave sensor and determines whether or not the objects are a same object, and recognizes the position of the object based on the determination result;
   the timing setting unit changes a reduction ratio from an initial object width when the object width is changed, as a number of consecutive same-object determinations regarding the object increases; and
   the reduction ratio is increased as the number of consecutive same-object determinations increases.

4. The vehicle control apparatus according to claim 3, wherein:
   the timing setting unit changes the reduction ratio such that the object width after change is not greater than the initial object width when the calculated overlap ratio is equal to or less than the threshold, even when the number of consecutive same-object determinations increase.

5. The vehicle control apparatus according to claim 4, wherein:
   the timing setting unit calculates a speed of increase in the reduction ratio from the initial object width that is based on the increase in the number of consecutive same-object determinations, based on the overlap ratio; and
   an amount of increase in the reduction ratio is calculated such that the speed of increase in the reduction ratio decreases as the overlap ratio decreases.

6. The vehicle control apparatus according to claim 3, wherein:
   the timing setting unit calculates a speed of increase in the reduction ratio from the initial object width that is based on the increase in the number of consecutive same-object determinations, based on the overlap ratio; and
   an amount of increase in the reduction ratio is calculated such that the speed of increase in the reduction ratio decreases as the overlap ratio decreases.

7. The vehicle control apparatus according to claim 1, wherein:
   the object recognizing unit uses the position of the object detected based on the captured image in which the area ahead of the own vehicle is captured by the image sensor and a position of an object detected by an electromagnetic wave sensor and determines whether or not the objects are a same object, and recognizes the position of the object based on the determination result;
   the timing setting unit changes a reduction ratio from an initial object width when the object width is changed, as a number of consecutive same-object determinations regarding the object increases; and
   the reduction ratio is increased as the number of consecutive same-object determinations increases.

8. The vehicle control apparatus according to claim 7, wherein:
   the timing setting unit changes the reduction ratio such that the object width after change is not greater than the initial object width when calculated overlap ratio is equal to or less than the threshold, even when the number of consecutive same-object determinations increase.

9. The vehicle control apparatus according to claim 8, wherein:
   the timing setting unit calculates a speed of increase in the reduction ratio from the initial object width that is based on the increase in the number of consecutive same-object determinations, based on the overlap ratio; and an amount of increase in the reduction ratio is calculated such that the speed of increase in the reduction ratio decreases as the overlap ratio decreases.

10. The vehicle control apparatus according to claim 7, wherein:
the timing setting unit calculates a speed of increase in the reduction ratio from the initial object width that is based on the increase in the number of consecutive same-object determinations, based on the overlap ratio; and
an amount of increase in the reduction ratio is calculated such that the speed of increase in the reduction ratio decreases as the overlap ratio decreases.

11. The vehicle control apparatus according to claim 1, further comprising:
a state determining unit that determines whether or not a state is such that a distance in the lateral direction from the object to the own vehicle increases, wherein
the timing setting unit reduces the object width when the state is determined to be such that the distance in the lateral direction from the object to the own vehicle increases, compared to the object width when the state is not determined to be such that the distance in the lateral direction from the object to the own vehicle increases.

12. The vehicle control apparatus according to claim 1, further comprising:
a control unit that performs the collision avoidance control at the set operation timing.

13. The vehicle control apparatus according to claim 1, further comprising:
the collision avoidance control includes operating automatic braking of a brake apparatus that decelerates a vehicle speed of the own vehicle.

14. The vehicle control apparatus according to claim 1, further comprising:
the collision avoidance control includes issuing a warning sound to a driver of the own vehicle by a warning apparatus provided in the own vehicle.

15. A vehicle control method for performing collision avoidance control to avoid a collision with an object ahead of an own vehicle, the vehicle control method comprising:
recognizing at least a position of the object based on a captured image in which an area ahead of the own vehicle is captured by an image sensor;
determining a likelihood of a collision between the own vehicle and the object of which the position is recognized;
calculating an object width indicating a size of the object in a lateral direction, based on the captured image, when the likelihood of a collision between the object and the own vehicle is determined to be present;
calculating an overlap ratio indicating a proportion of an amount of overlap in the lateral direction between the calculated object width and a determination area that is virtually set ahead of the own vehicle; and
setting an operation timing for the collision avoidance control based on the calculated overlap ratio, wherein
the object width when the overlap ratio is less than a predetermined threshold is changed such that the object width is less than the object width when the overlap ratio is greater than the predetermined threshold, and the operation timing for the collision avoidance control is set based on a new overlap ratio calculated based on the determination area and the object width after change.

* * * * *